(12) United States Patent
Menguy et al.

(10) Patent No.: US 11,622,543 B2
(45) Date of Patent: Apr. 11, 2023

(54) SYSTEM AND METHOD FOR INJECTING AN EGG

(71) Applicant: EGG-CHICK AUTOMATED TECHNOLOGIES, Landivisiau (FR)

(72) Inventors: Florent Menguy, Brest (FR); Gildas Lincot, Plouenan (FR); Bertrand Malet, Guiclan (FR)

(73) Assignee: EGG-CHICK AUTOMATED TECHNOLOGIES, Landivisiau (FR)

( * ) Notice: Subject to any disclaimer, the term of this patent is extended or adjusted under 35 U.S.C. 154(b) by 512 days.

(21) Appl. No.: 16/645,901

(22) PCT Filed: Sep. 11, 2018

(86) PCT No.: PCT/IB2018/056949
§ 371 (c)(1),
(2) Date: Mar. 10, 2020

(87) PCT Pub. No.: WO2019/049114
PCT Pub. Date: Mar. 14, 2019

(65) Prior Publication Data
US 2020/0275639 A1 Sep. 3, 2020

Related U.S. Application Data

(60) Provisional application No. 62/556,582, filed on Sep. 11, 2017.

(51) Int. Cl.
*A01K 45/00* (2006.01)
(52) U.S. Cl.
CPC .................. *A01K 45/007* (2013.01)
(58) Field of Classification Search
CPC ..... A01K 45/007; A61M 5/178; A61D 1/025; C12M 21/10
See application file for complete search history.

(56) References Cited

U.S. PATENT DOCUMENTS 1,213,001 A * 1/1917 Philips .............. A61M 25/0606
128/207.29
4,610,242 A * 9/1986 Santangelo ....... A61M 25/0606
600/114

(Continued)

FOREIGN PATENT DOCUMENTS

CN 101287364 A 10/2008
FR 3071701 A1 * 4/2019 ........... A01K 45/007

OTHER PUBLICATIONS

International Search Report dated Feb. 11, 2019 in PCT/IB2018/056949 filed on Sep. 11, 2018.

(Continued)

*Primary Examiner* — Ebony E Evans
(74) *Attorney, Agent, or Firm* — Oblon, McClelland, Maier & Neustadt, L.L.P.

(57) ABSTRACT

An injector, injection systems and methods for injecting a substance into an egg, where the injector includes a shaft, a sheath extending from the shaft in a longitudinal direction; a trocar positioned at least partly inside the sheath; and a needle at least partly inside the trocar. The injector can further include a locking mechanism configured to lock the trocar with the shaft in the longitudinal direction in a first position of the trocar relative to the sheath, the locking mechanism being further configured to unlock the trocar from the shaft in the longitudinal direction in a second position of the trocar relative to the sheath. The needle is fully inside the trocar in the first longitudinal position and at least partly extends from the trocar in the second longitudinal position.

20 Claims, 10 Drawing Sheets

(56) References Cited

U.S. PATENT DOCUMENTS

| | | | |
|---|---|---|---|
| 5,056,464 A | 10/1991 | Lewis | |
| 5,136,979 A * | 8/1992 | Paul | A61D 19/04 119/6.8 |
| 5,176,101 A * | 1/1993 | Paul | A61D 19/04 604/199 |
| 8,307,784 B2 * | 11/2012 | Nadreau | A01K 45/007 119/6.8 |
| 8,336,491 B2 * | 12/2012 | Yvin | A01K 45/007 119/6.6 |
| 9,532,552 B2 * | 1/2017 | Van De Zande | A01K 45/007 |
| 10,618,741 B2 * | 4/2020 | Schnupper | A23L 15/00 |
| 2004/0040511 A1 * | 3/2004 | Williams | A01K 45/007 119/6.8 |
| 2006/0075973 A1 | 4/2006 | Wolfe et al. | |
| 2010/0139567 A1 * | 6/2010 | Yvin | A01K 45/007 119/6.8 |
| 2010/0307419 A1 * | 12/2010 | Nadreau | A01K 45/007 119/6.8 |

OTHER PUBLICATIONS

Combined Russian Office Action and Search Report dated Feb. 24, 2022 in corresponding Russian Patent Application No. 2020113154 (with English Translation), 24 pages.

Combined Chinese Office Action and Search Report dated Aug. 4, 2021 in Patent Application No. 201880058971.8 (with English language translation), 15 pages.

Indonesian Office Action dated Oct. 14, 2021 in Indonesian Patent Application No. P00202001916, 3 pages.

Brazilian Office Action dated Jul. 12, 2022 in Brazilian Patent Application No. 112020004704 (with partial English translation), 6 pages.

* cited by examiner

SYSTEM AND METHOD FOR INJECTING AN EGG

BACKGROUND

Field of the Invention

The present disclosure relates to injectors, injection systems and methods for injecting a substance into eggs.

Description of the Related Art

Certain injection systems and methods for injecting a substance into eggs are known. The substances that can be injected include vaccines, antibiotics or vitamins, in order to limit the mortality rate or increase the growth of the embryos. The types of eggs injected include poultry eggs, such as eggs from chickens, turkeys, ducks, geese, quail, pheasants, ostriches, etc. Such injection systems and methods conventionally include a plurality of injectors vertically movable above a conveyor conveying eggs to be treated, the eggs being placed in alveoli in incubation trays.

Such systems and methods were developed by the present assignee, as described for example in WO 2009/027442, which is hereby incorporated by reference. Such a system enables injection in a two-step process, a step of piercing the shell and at least the shell membrane of an egg by moving a needle, and then a step of injecting the treatment substance via the needle. The piercing step includes a first movement of the needle to pierce the shell with a first penetration force and then a second movement of the needle to pierce at least the shell membrane with a second penetration force lower than the first penetration force. Such a system has been successful for certain applications and circumstances.

Other systems include more complex arrangements of parts, with a punch and a needle with the punch surrounding the needle. The punch is actuated by a first actuator to break the shell, and the needle is actuated by another actuator to move into the interior of the egg. Such a system requires a double shafted, double acting air driven cylinder that drives the punch and the needle in reciprocal opposite directions, a pair of air entry fittings connected to respective air supply tubes.

SUMMARY

There is a need for simpler injectors, injection systems and methods, that are reliable, cost effective, require few parts and that can be conveniently cleaned and sanitized as needed.

The present invention addresses these needs. The present invention covers various embodiments of injectors, injection systems and methods for injecting a substance into an egg. In one preferred, non-limiting embodiment, the injector includes a shaft, a sheath extending from the shaft in a longitudinal direction; a trocar positioned at least partly inside the sheath; a needle at least partly inside the trocar; and a locking mechanism configured to lock the trocar with the shaft in the longitudinal direction in a first position of the trocar relative to the sheath, the locking mechanism being further configured to unlock the trocar from the shaft in the longitudinal direction in a second position of the trocar relative to the sheath. The needle is fully inside the trocar in the first longitudinal position and at least partly extends from the trocar in the second longitudinal position.

An injection system according to a preferred, non-limiting embodiment includes the above injector and a single actuator configured to move the injector from the first position to the second position. Another injection system according to another preferred, non-limiting embodiment includes a plurality of injectors mounted on a main plate, a main actuator to move the main plate and a plurality of individual actuators to move each individual injector. The main actuator can move the injectors from the first position to an intermediate position, and the individual actuators can move the injectors from the intermediate position to the second position. An injection method according to a preferred, non-limiting embodiment injects eggs using one of above injectors and/or injection systems.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

A more complete appreciation of the present advancements and many of the attendant advantages thereof will be readily obtained as the same becomes better understood by reference to the following detailed description when considered in connection with the accompanying drawings. However, the accompanying drawings and their exemplary depictions do not in any way limit the scope of the advancements embraced by the specification. The scope of the advancements embraced by the specification and drawings are defined by the words of the accompanying claims.

Figure 1A:
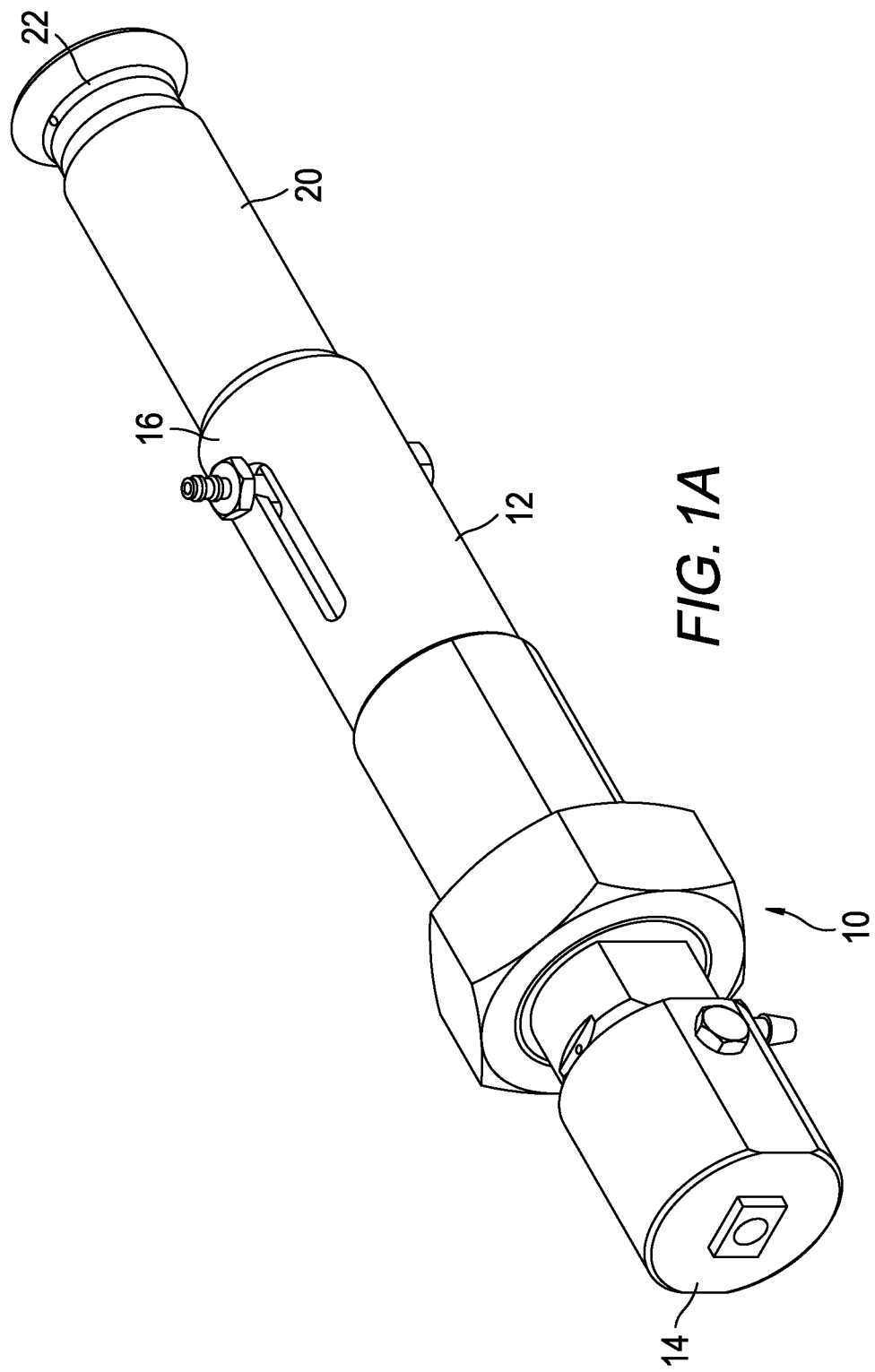
FIG. 1A is a perspective view of an injector according to one non-limiting embodiment of the present invention.
Figure 1C:
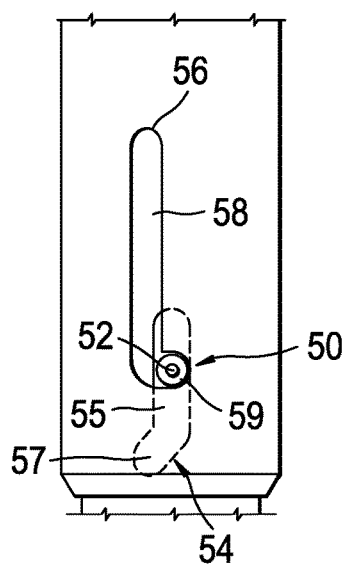
FIG. 1C is a partial view of the injector of FIG. 1B showing a non-limiting embodiment for the locking mechanism according to the present invention.
Figure 1B:
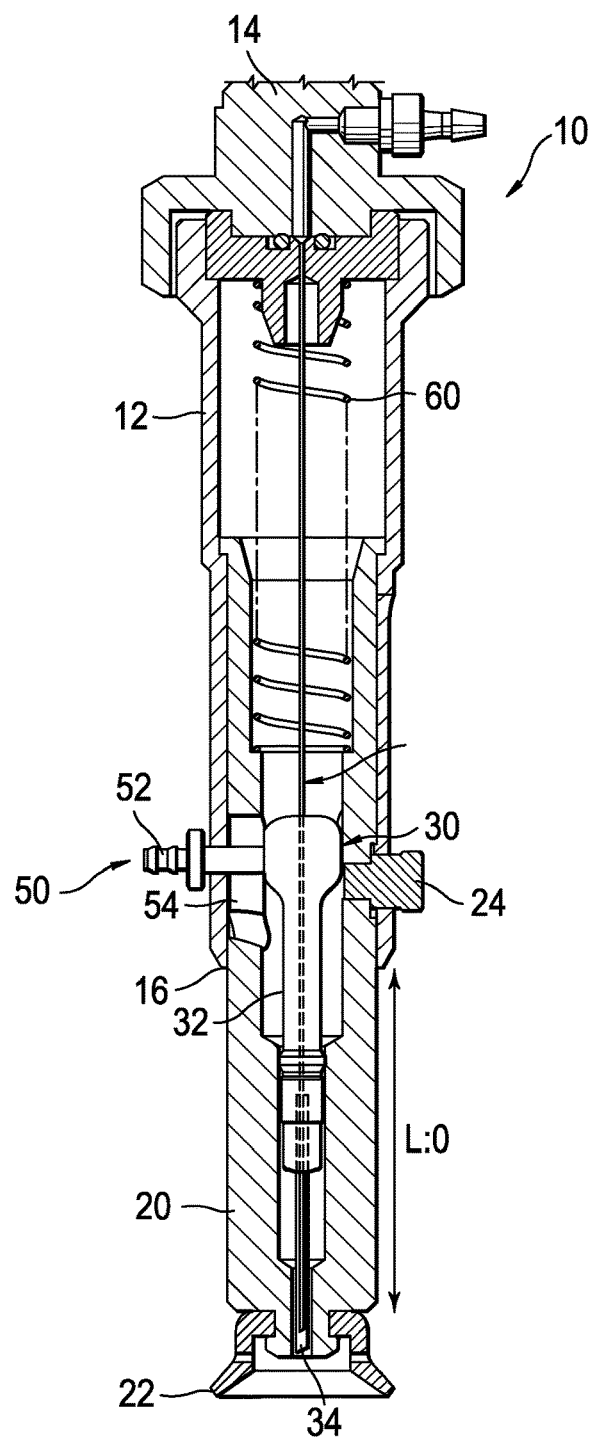
FIG. 1B is a cross-section view of an injector according to another non-limiting embodiment of the present invention when the injector is in an initial position.
Figure 1B:
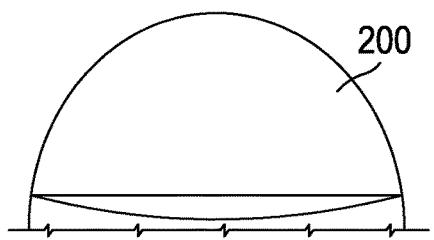

FIG. 1A is a perspective view of an injector 10 for injecting a substance into an egg according to one non-limiting embodiment of the present invention. The injector 10 includes a shaft 12 with a first end 14 and a second end 16. The first and second ends define a longitudinal direction for the shaft. The second end defines an opening. The injector 10 further includes a sheath 20 extending from the shaft 12, for example by being positioned at least partly inside the shaft 12. A suction cup 22 can be mounted at the end of the sheath 20. The suction cup 22 is configured to contact the top of an egg 200. The sheath 20 can have an anti-rotation member 24 that prevents rotation between the sheath 20 and the shaft 12. The anti-rotation member may extend through an opening in the shaft 12 into a recess in the sheath 20. As seen in FIG. 1B, the sheath 20 extends in the longitudinal direction from the inside of the shaft 12 via the opening in the second end 16 of the shaft 12. A trocar 30 is positioned at least partly inside the sheath 20. A needle 40 is attached to the first end 14 of the shaft 12, and extends at least partly inside the trocar 30. The injector 10 can include a spring 60, such as a compression spring, between the first end 14 of the shaft 12 and the sheath 20. This compression spring 60 can be biased to push the sheath 20 toward the second end 16 of the shaft 12. Other known biasing mechanisms may be used instead of a spring.

As seen in FIGS. 1B, 2A, 3A, 4A, and 6A, the trocar 30 can include a body 32 and a cannula 34. As shown in FIG. 6B, the cannula 34 can have a sharp tip to pierce the shell of the egg 200, and the needle 40 can also have a sharp tip to pierce the membranes of the egg. The cannula 34 and needle 40 can be made of metal, plastic, or other materials.

The injector 10 further includes a locking mechanism 50 configured to lock the trocar 30 with the shaft 12 in the longitudinal direction in an initial longitudinal position of the injector shown in FIG. 1B. In a preferred embodiment, the trocar 30 is locked with the shaft 12 in at least the longitudinal direction such that the trocar 30 and the shaft 12 move together along the longitudinal direction. In this initial position, the trocar 30 and the sheath 20 are in a first relative position in the longitudinal direction.

Figure 3B:
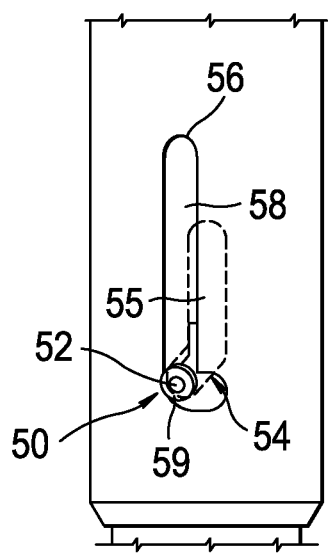
FIG. 3B is a partial view of the injector of FIG. 3A showing the locking mechanism in the other intermediate position.
Figure 3A:
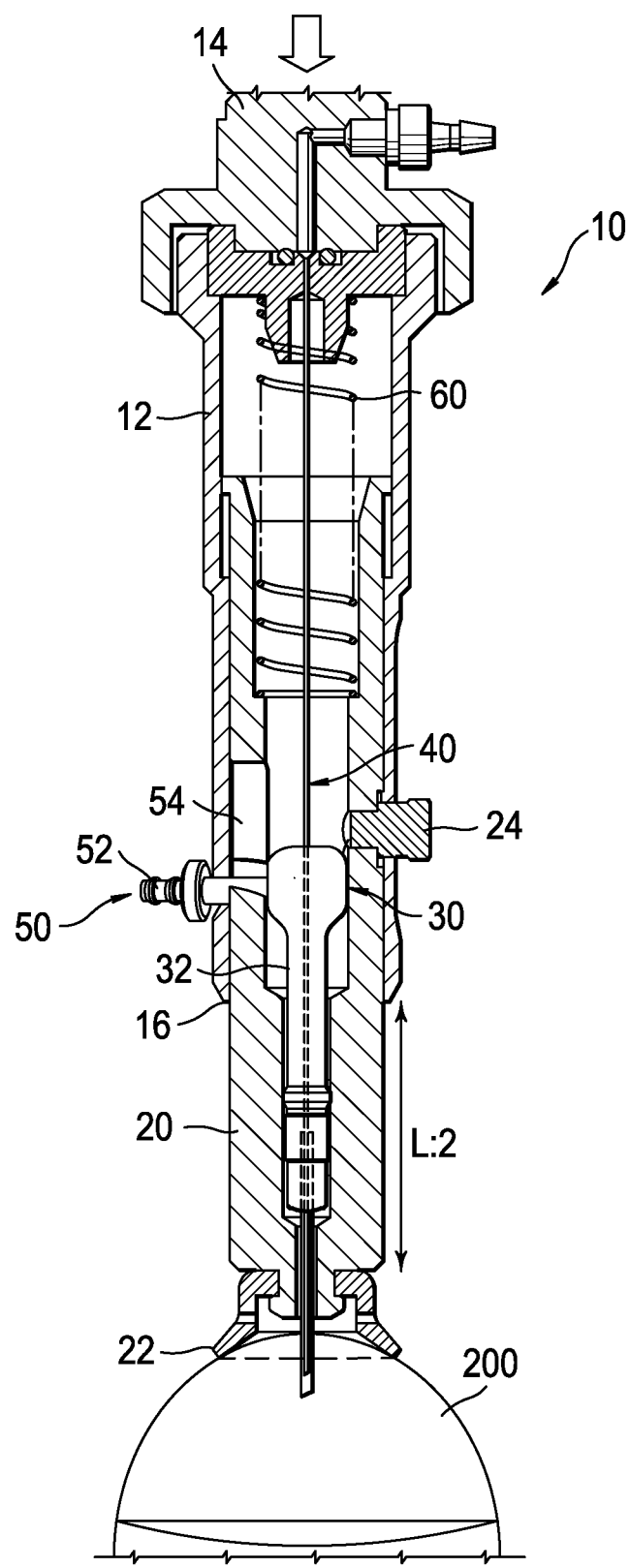
FIG. 3A is a cross-section view of the injector of FIG. 1B when the injector is in another intermediate position.
Figure 4B:
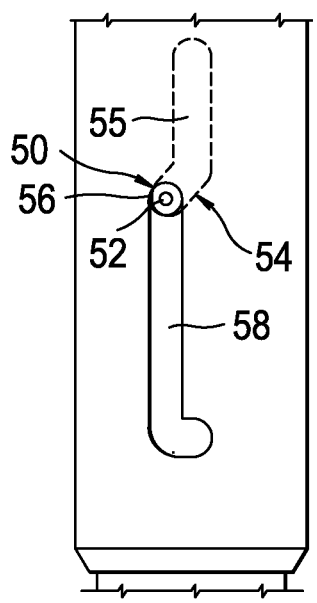
FIG. 4B is a partial view of the injector of FIG. 4A showing the locking mechanism in the final position.
Figure 4A:
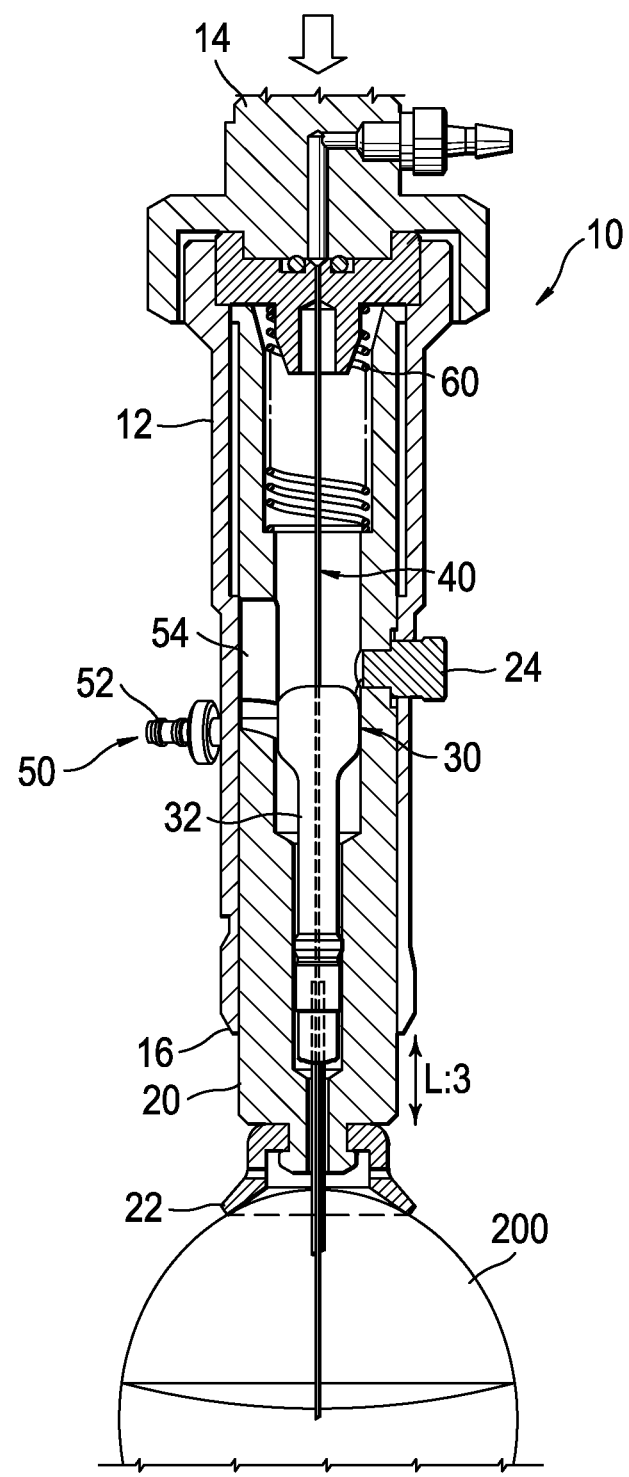
FIG. 4A is a cross-section view of the injector of FIG. 1B when the injector is in a final position.

The locking mechanism 50 is further configured to unlock the trocar 30 from the shaft 12 in the longitudinal direction in other longitudinal positions of the injector, as will be described further below. In other words, the trocar 30 and the shaft 12 are coupled to move together when the shaft 12 moves from the initial position (FIG. 1B-C) to an intermediate position (FIG. 2A-B) along the longitudinal direction, and the trocar 30 and the shaft 12 are decoupled from each other when the shaft moves from the intermediate position (FIG. 3A-B) to the final position (FIGS. 4A-B).

Figure 6A:
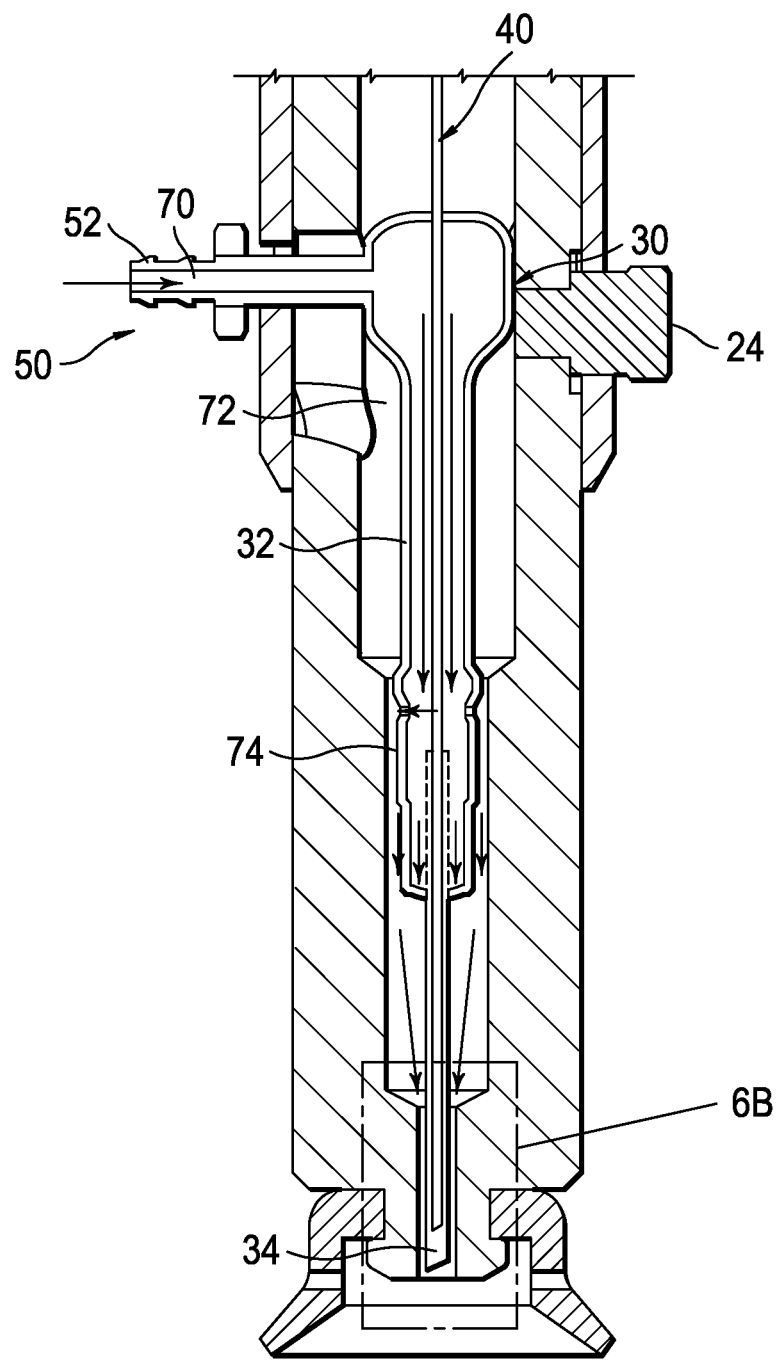
FIG. 6A is a cross-section view of the trocar according to a non-limiting embodiment of the present invention when the injector is in its initial position.
Figure 6B:
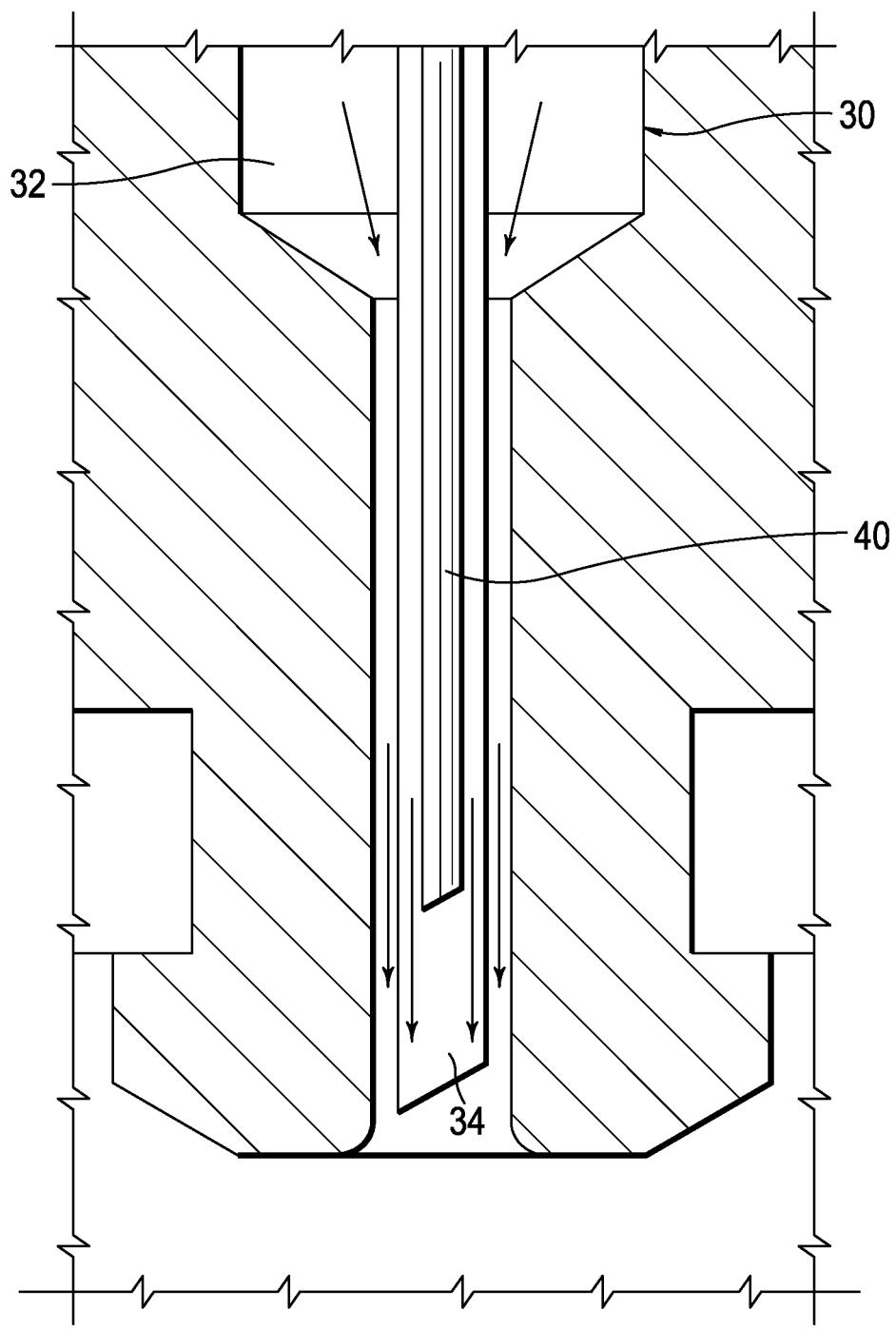
FIG. 6B is a partial view showing the tip of the cannula of the trocar and the tip of the needle shown in FIG. 6A.

In the initial position shown in FIGS. 1B, and 6A-B, and while the trocar 30 and the shaft 12 are still coupled (FIG. 2A) the needle 40 is fully inside the trocar 30. In the other positions of the injector 10, the needle 40 at least partly extends from the trocar 30, as seen for example in FIG. 4A.

In a preferred, non-limiting embodiment, the locking mechanism 50 includes a locking member 52 fixed to the trocar 30. This locking member 52 can be a shaft, a rod, or another part of various possible shapes. The locking member 52 can be made of metal, plastic, or other rigid materials, and can be attached to other parts of the trocar 30 or can be an integral part of the trocar. The locking mechanism 50 can also include a sheath groove 54 defined by the sheath 20, as shown in broken lines in FIGS. 1C, 2B, 3C and 4B. The locking mechanism can also include a shaft groove 56 defined in the shaft 12, as seen in FIGS. 1C, 2B, 3B and 4B. The locking member 52 of the trocar 30 can extend through the sheath groove 54 and through the shaft groove 56 in various longitudinal positions of the injector, including the initial, intermediate and final positions.

Figure 2B:
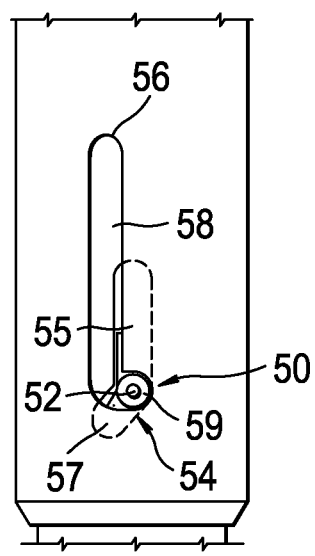
FIG. 2B is a partial view of the injector of FIG. 2A showing the locking mechanism in the intermediate position.

The sheath groove 54 can include a sheath groove longitudinal portion 55 and an oblique portion 57 relative to the longitudinal direction. The locking member 52 extends through the sheath groove longitudinal portion 55 in the initial and some intermediate positions of the injector, as seen in FIGS. 1C and 2B. The locking member 52 extends through the oblique portion 57 in other positions, including other intermediate positions and the final position, as seen in FIGS. 3B and 4B.

The shaft groove 56 can include a shaft groove longitudinal portion 58 and a transverse portion 59 relative to the longitudinal direction. The locking member 52 extends through the transverse portion 59 in the initial and some intermediate positions of the injector, as seen in FIGS. 1C and 2B. The locking member 52 extends through the shaft groove longitudinal portion 58 in other intermediate and final positions, as seen in FIGS. 3B and 4B. The longitudinal portion of the shaft groove 58 may be longer, shorter, or the same length as the longitudinal portion of the sheath groove 55. Further, the longitudinal portion of the shaft groove 58 may overlap the longitudinal portion of the sheath groove 55 in a transverse direction as shown in FIGS. 1B, 2B, and 3B.

More generally, the injector 10 can be configured such that, during a single movement of the shaft 12 along the longitudinal direction, the trocar 30 can first be locked with the shaft 12 and unlocked from the sheath 20, then unlocked from the shaft 12 but locked with the sheath 20. This locking and unlocking can be enabled within the single movement using simple mechanical parts, without the need for complex electrical, magnetic, pneumatic or optical devices or sensors.

Figure 2A:
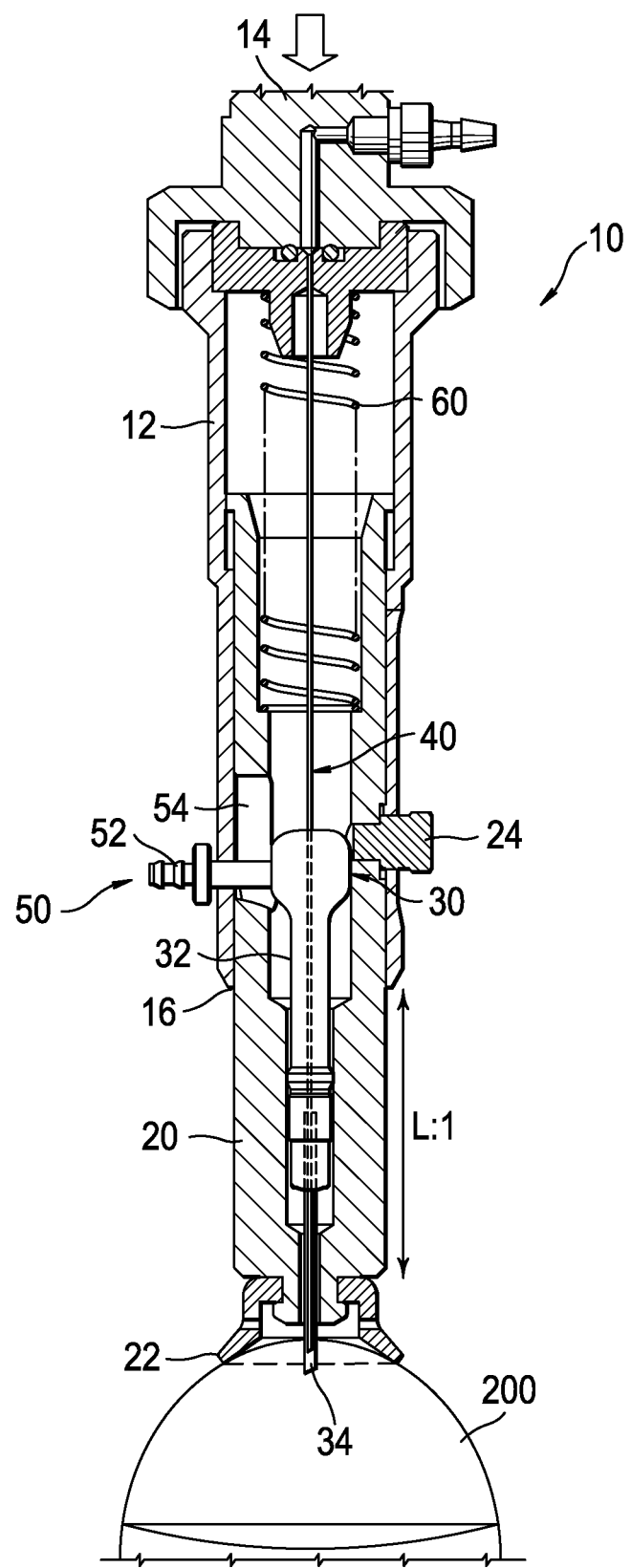
FIG. 2A is a cross-section view of the injector of FIG. 1B when the injector is in an intermediate position.

During this single movement along the longitudinal direction, the suction cup 22 moves toward the egg 200 (FIG. 1B), and makes contact with the top of the egg 200 (FIG. 2A). After contact with the egg 200, the sheath 20 is pushed up along the longitudinal direction relative to the trocar 30 (FIG. 2A). With the sheath 20 moved up, the trocar 30, which is still locked with the shaft 12 and thus continues to move with the shaft 12, extends from the sheath 20 and pierces the shell of the egg 200, as seen in FIG. 2A. At that point, the needle 40 is still inside the trocar 30.

As the shaft 12 continues its movement toward the egg 200, the locking member 52 of the trocar 30 is pushed from the transverse portion 59 of the shaft groove 56 (FIG. 2B) to the longitudinal portion 58 (FIG. 3B), and from the longitudinal portion 55 of the sheath groove 54 (FIG. 2B) to the oblique portion 57 (FIG. 3B). The oblique configuration of the oblique portion 57 forces a slight rotation of the trocar 30, which rotation places the locking members 52 into the longitudinal portion 58 of the shaft groove 56, thereby unlocking the trocar 30 form the shaft 12.

After the trocar 30 is unlocked from the shaft 12, these two parts no longer move together in the longitudinal direction as the shaft 12 moves toward the egg 200. But, the trocar 30 becomes locked with the sheath 20 such that these two parts move together in the longitudinal direction, as the shaft 12 continues its single movement toward the egg 200 (FIGS. 3A-B, 4A-B).

After the trocar 30 is unlocked from the shaft 12, the trocar 30 stops extending into the egg 200. However, the needle 40, which is fixed to the first 14 end of the shaft 12, continues to extend into the egg 200 as the shaft 12 continues its movement toward the egg 200 (FIG. 4A). Ultimately, the top of the sheath 20 contacts the first end 14 of the shaft 12 and the needle 40 is fully extended outside the trocar 30

(FIG. 4A). The maximum extension of the needle 40 can be predetermined such that the needle 40 enters the sites of injection of most or all eggs, even if the eggs have different sizes. Once the needle is fully extended, the single movement of the shaft 12 toward the egg 200 can stop, and the injection can be performed. After the injection is finished, the shaft 12 can be moved back away from the egg 200 and the various steps and configurations described above are repeated in reverse order. As just described, the shaft 12 can perform a single movement that results in the trocar 30 piercing the shell of the egg 200, followed by the needle 40 moving into the interior of the egg, in a simple manner with only simple mechanical parts and without sensors nor complex multi shafted, multi actuator arrangements.

In a preferred embodiment, the locking member 52 is fixed to the body 32 of the trocar 30. The needle 40 can extend through an entirety of the body 32 and fixed to the first end 14 of the shaft 12. As best seen in FIG. 6A, the locking member 52 can define an orifice 70 in fluid communication with a channel 72 inside of the trocar 30. The needle 40 is inside the channel 72. The body 32 of the trocar 30 can further define another orifice 74 in fluid communication with the channel 72 and with the orifice 70 in the locking member 52. This non-limiting structure can be used to clean the trocar 30 and needle 40 after an injection by introducing a cleaning substance inside the orifice 70. The cleaning fluid can thus enter the channel 72 and clean the inside of the trocar 30 and the outside of the needle 40 located inside the trocar. The cleaning fluid can also clean the outside of the trocar 30 after exiting via the orifice 74. Thus, all parts that were in contact with the egg 200, including the portions of the cannula 34 and the needle 40 that entered the egg, can be cleaned. Further, the cleaning fluid is not wasted on parts that were not in contact with the egg.

Figure 5A:
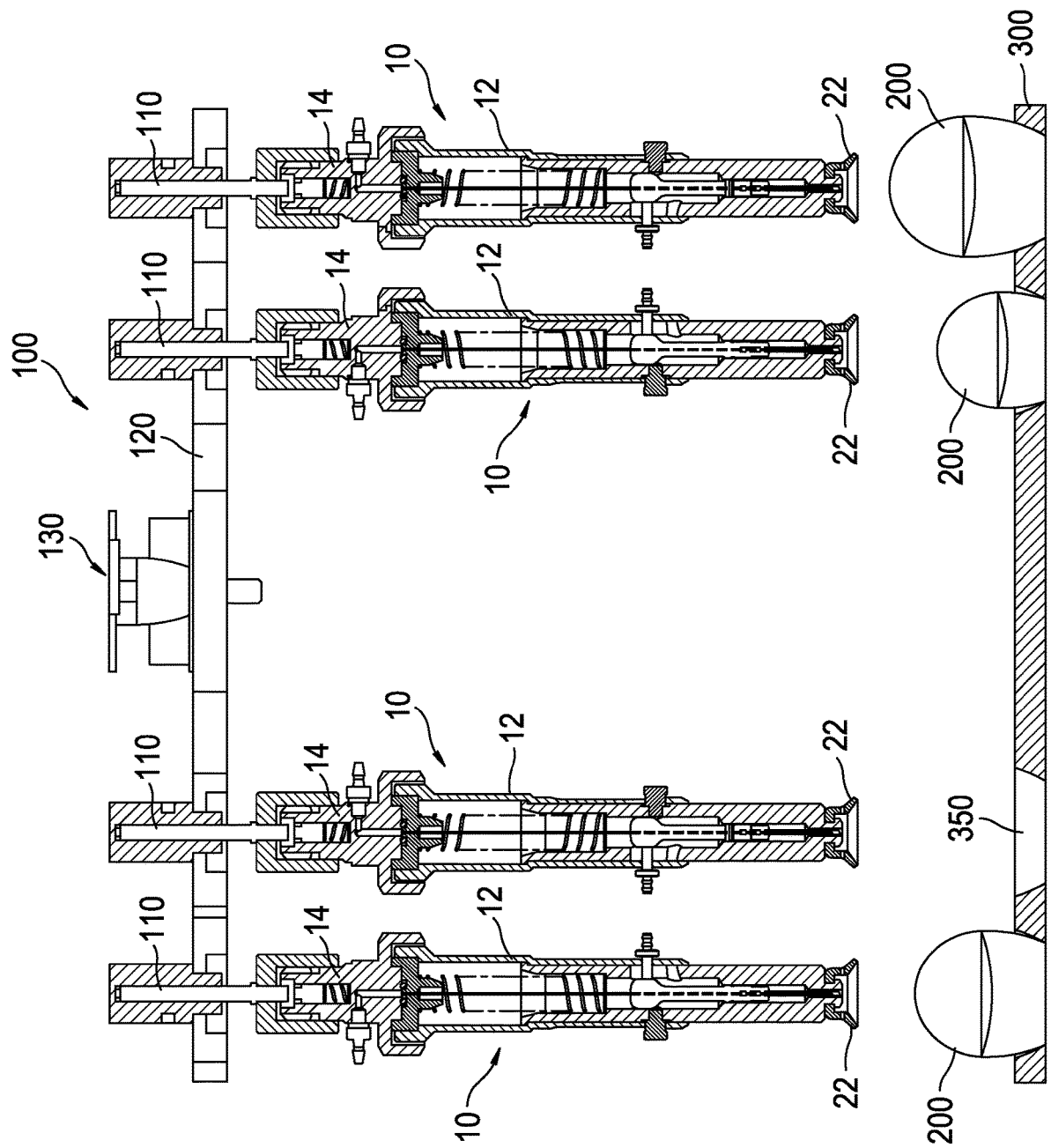
FIG. 5A is a cross-section view of an injection system according to a non-limiting embodiment of the present invention when the system is in an initial position.
Figure 5B:
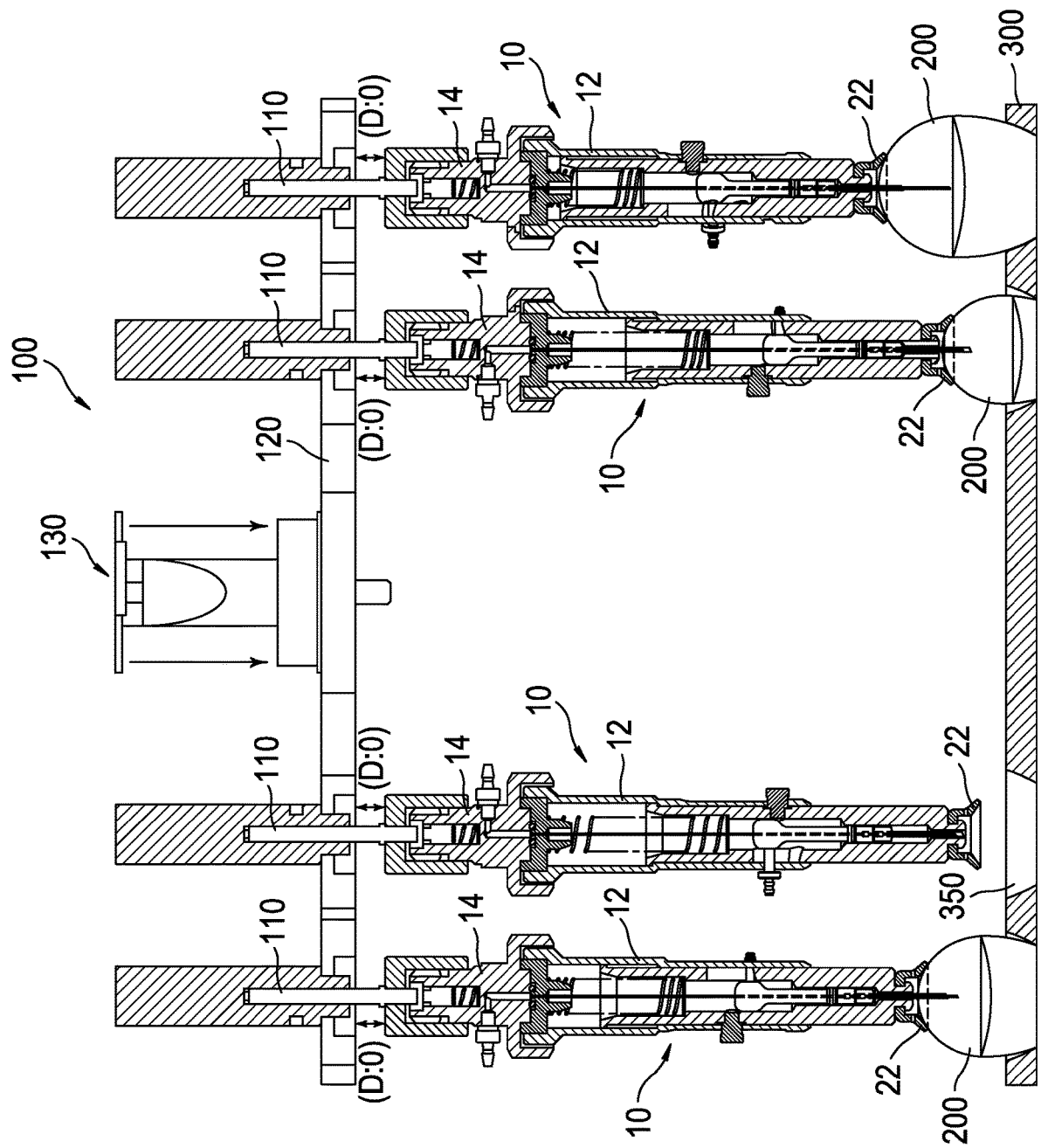
FIG. 5B is a cross-section view of the injection system of FIG. 5A when the system is in an intermediate position.
Figure 5C:
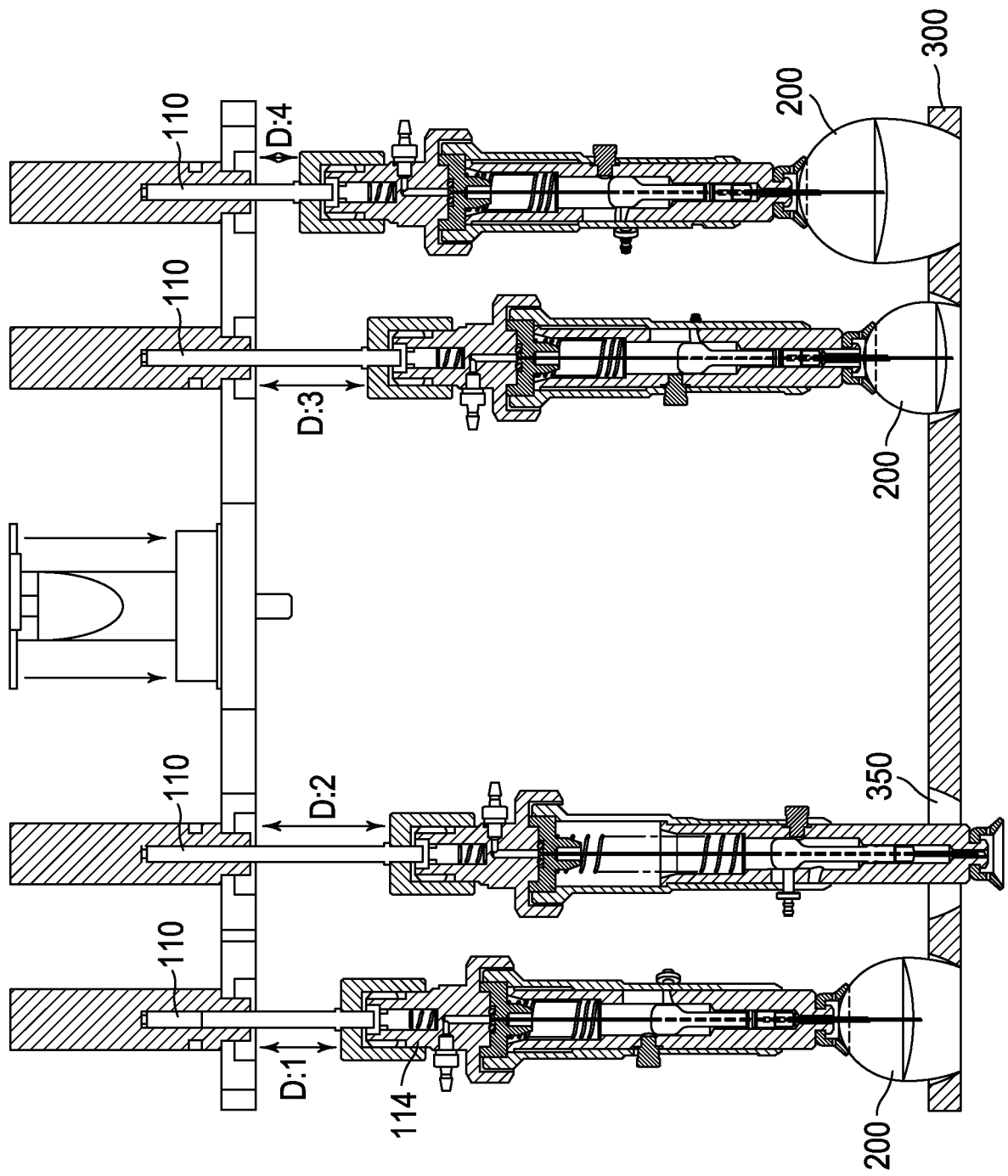
FIG. 5C is a cross-section view of the injection system of FIG. 5A when the system is in a final position.

The injector 10 can be part of a system 100, as shown in FIGS. 5A-C. The system 100 includes the injector 10, and an actuator 110 configured to move the injector 10 in a longitudinal direction. The first end 14 of the shaft 12 can be mechanically coupled to the actuator 110 such that the actuator 110 can move the shaft 12 from an initial position, as shown for example in FIGS. 5A-B, to a final position, as shown for example in FIG. 5C. The system 100 can also include a plurality of injectors 10. Such a system includes a main support 120 to which the injectors 10 are mounted, as shown in FIG. 5A-C.

The system 100 further includes a main actuator 130 configured to move the main support 120 and thus all the injectors 10 together along a longitudinal direction, as shown in FIG. 5B. In a preferred embodiment, the main actuator 130 moves the main support 120 so that the suction cups 22 of the injectors contact the top of the eggs present in the tray below the injectors, as shown in FIG. 5B.

Advantageously, each individual actuator 110 is coupled to a single corresponding injector 10 of the plurality of injectors. Each individual actuator 110 is configured to move the corresponding injector 10 in the longitudinal direction independent of the other actuators 110. The main actuator 130, each individual actuator 110 and each corresponding injector 10 can be configured to mechanically control the piercing of the shell of the eggs 200 present below the injectors with the trocar 30, and the movement of the needle 40 into the interior of the eggs 200, regardless of the size of the egg. As seen in FIG. 5B, the first egg 200 from the left is of average size. For this egg, the movement from the main actuator 130 was sufficient to pierce the shell with the trocar 30 and to unlock the trocar from the shaft 12 of the injector 10. The second position from the left of FIG. 5B is empty, such that the main actuator 130 lowered the injector 10 but the trocar 30 was not unlocked from the shaft 12 such that the trocar 30 is still protected inside the sheath 20. The third position from the left of FIG. 5B includes an egg 200 of relatively small size such that the trocar 30 has pierced the shell, and the trocar 30 is being unlocked. The fourth position from the left of FIG. 5B includes an egg 200 of relatively large size, such that the trocar 30 has pierced the shell, is unlocked form the shaft 12 and the needle 40 started to extend outside the trocar 30. The control of the injection can be completed using the individual actuators 110, as shown in FIG. 5C. The eggs 200 are being injected with the needles 40 fully extended due to the individual actuators 110 moving each shaft 12 a different distance, as needed depending on the size of each egg 200. For the second position, without any egg, the trocar 30 is still locked with the shaft 12 and protected inside the sheath 20, and the needle 40 is protected inside the trocar 30. While the above system 100 was described with the injectors 10 above the eggs 200, other systems fall within the scope of the invention, including systems 100 where the injectors 10 are below the eggs 200 and the eggs 200 are injected from below.

Other systems can be implemented within the scope of the present invention. For example, the system 100 could use only a single main actuator 130, without any individual actuators 110, to control the injections of the eggs 200. The main actuator 130 could be configured to move the injectors 10 such that the trocars 30 pierce the shells of the eggs 200, and the locking mechanisms 50 described above enable the unlocking of the trocars 30 from the needles 40 such that, as the main actuator 130 continues to move the injectors 10, the needles 40 pierce the membranes of the eggs 200 and inject the eggs.

Another system considered within the scope of the invention is a system 100 without a main actuator 130, with only individual actuators 110, to control the injections of the eggs 200. The individual actuators 110 could be configured to move the injectors 10 such that the trocars 30 pierce the shells of the eggs 200, and the locking mechanism 50 described above enables the unlocking of the trocars 30 from the needles 40 such that, as the individual actuators 110 continue to move the injectors 10, the needles 40 pierce the membranes of the eggs 200 and inject the eggs.

Yet another system considered within the scope of the invention is a system 100 where the eggs are moved toward the injectors 10. Such a system includes one or more actuators under the eggs 200 such that the eggs are moved toward the injectors 10. Such actuator(s) can be the sole actuators in the system, or can be in addition to actuators coupled to the injectors to move the injectors 10 toward the eggs. In both systems, the actuators are configured to move the eggs, and possibly the injectors 10, such that the trocars 30 pierce the shells of the eggs 200, and the locking mechanism 50 described above enables the unlocking of the trocars 30 from the needles 40 such that, as the actuator(s) continue to move the eggs, the needles 40 pierce the membranes of the eggs 200 and inject the eggs.

More generally, it should be recognized that the locking mechanism 50 is triggered by the longitudinal movement of the sheath 20 inside the shaft 12. This is one reason that embodiments of the system work both when injectors move to the eggs or when eggs move to the injector as both operations cause longitudinal movement of the sheath 20 inside shaft 12.

In a preferred embodiment, the main actuator 130 can apply a first force during the first longitudinal movement, and each individual actuator 110 is configured to apply a second force during the second longitudinal movement, the first force being greater than the second force.

The above system can be used to perform a method for injecting a substance into a plurality of eggs 200. The method can include a step of positioning a tray 300 of eggs 200 under a plurality of injectors 10. The tray 300 can have a plurality of alveoli 350, a sub-set of alveoli containing an egg 200 and another sub-set of alveoli 350 being empty. The injectors 10 can be lowered to an initial distance with the main injector 130, as shown in FIG. 5B, such that each egg 200 on the tray 300 is in contact with one injector 10. The trocars 30 in each injector 10 in contact with an egg 200 can be extended out of the sheath 20 to pierce the shell of each egg 200 with the trocar 30, while not extending trocars 30 out of injectors 10 above empty alveoli, as shown in FIG. 5B. Alternatively, the system 100 can include a sensor (not shown) to detect empty alveoli and the individual actuators 110 corresponding to empty alveoli are not activated. For each injector 10, the trocar 30 can be extended with the main actuator 130. Needles 40 can then be extended out of the trocars 30 for each injector 10 in contact with an egg 200 to inject the egg 200 with the substance, while not extending needles 40 out of the trocars 30 for injectors above empty alveoli. For each injector 10, the needle 40 can be extended with an individual actuator 110. The extending of the trocar 30 can be performed with a first force and the extending of the needles 40 can be performed with a second force, the first force being greater than the second force. The extending of the needles 40 can be performed by mechanically decoupling the trocars 30 from the needles 40 in the longitudinal direction. The method can further include a step of cleaning the trocars 30 and the needles 40 by injecting a cleaning fluid inside the trocars 30, as shown in FIG. 6A-B.

Obviously, numerous modifications and variations of the present invention are possible in light of the above teachings. It is therefore to be understood that within the scope of the appended claims, the invention may be practiced otherwise than as specifically described herein.

What is claimed is:

1. An injector for injecting a substance into an egg, the injector comprising:
   a shaft with a first end and a second end, the first and second ends defining a longitudinal direction for the shaft, the second end defining an opening;
   a sheath extending at least partly from the shaft in the longitudinal direction;
   a trocar positioned at least partly inside the sheath;
   a needle at least partly inside the trocar; and
   a locking mechanism configured to lock the trocar with the shaft in the longitudinal direction in a first longitudinal position of the trocar relative to the sheath, the locking mechanism being further configured to unlock the trocar from the shaft in the longitudinal direction in a second longitudinal position of the trocar relative to the sheath,
   wherein said needle is fully inside the trocar in the first longitudinal position and at least partly extends from the trocar in the second longitudinal position,
   wherein the locking mechanism comprises a locking member fixed to the trocar and extending through the shaft and the sheath, and wherein the locking member defines an orifice having a first opening at an outermost end of the locking member and a second opening at an innermost end of the locking member in fluid communication with a channel inside of the trocar.

2. The injector of claim 1, wherein the sheath defines a sheath groove, wherein the shaft defines a shaft groove, and wherein the locking member of the trocar extends through the sheath and shaft grooves in both the first and second longitudinal positions.

3. The injector of claim 2, wherein the sheath groove comprises a sheath groove longitudinal portion and an oblique portion relative to the longitudinal direction, and wherein the locking member extends through the sheath groove longitudinal portion in the first longitudinal position and extends through the oblique portion in the second longitudinal position.

4. The injector of claim 2, wherein the shaft groove comprises a shaft groove longitudinal portion and a transverse portion relative to the longitudinal direction, and wherein the locking member extends through the transverse portion in the first longitudinal position and extends through the shaft groove longitudinal portion in the second longitudinal position.

5. The injector of claim 1, wherein the trocar comprises a body and a cannula, wherein the locking mechanism is fixed to the body, wherein the needle extends through an entirety of the body and is fixed to the first end of the shaft.

6. The injector of claim 5, wherein said needle includes a tip, said tip being inside said cannula of the trocar in first longitudinal position, and the tip being outside the cannula in the second longitudinal position.

7. The injector of claim 1, further comprising biasing mechanisms between the first end of the shaft and the sheath.

8. The injector of claim 1, wherein said needle is inside said channel.

9. The injector of claim 8, wherein a body of the trocar further defines another orifice in fluid communication with the channel and with the orifice in the locking member.

10. An injection system for injecting a substance into an egg, the system comprising:
   an injector; and
   an actuator configured to move in a longitudinal direction, wherein the injector comprises:
   a shaft with a first end mechanically coupled to the actuator such that the actuator is configured to move the shaft from an initial position to an intermediate position and from the intermediate position to a final position, wherein the shaft has a second end defining an opening, the first and second ends being on the longitudinal direction,
   a sheath positioned at least partly inside the shaft, the sheath extending from the inside of the shaft via the opening in the second end of the shaft,
   a trocar positioned at least partly inside the sheath, and
   a needle at least partly inside the trocar;
   wherein the trocar and the shaft are coupled to move together along the longitudinal direction when the actuator moves the shaft from the initial position to the intermediate position along the longitudinal direction, wherein the trocar and the shaft are decoupled from each other along the longitudinal direction when the actuator moves the shaft from the intermediate position to the final position, and
   wherein said needle is fully inside the trocar in the initial position and at least partly extends from the trocar in the final position,
   wherein the locking mechanism comprises a locking member fixed to the trocar and extending through the shaft and the sheath, and wherein the locking member defines an orifice having a first opening at an outermost end of the locking member and a second opening at an innermost end of the locking member in fluid communication with a channel inside of the trocar.

11. The injection system of claim 10, wherein the sheath defines a sheath groove, wherein the shaft defines a shaft groove, and wherein the locking member of the trocar extends through the sheath and shaft grooves in the initial, intermediate and final positions.

12. The injection system of claim 11, wherein the shaft groove comprises a shaft groove longitudinal portion and a transverse portion relative to the longitudinal direction, and wherein the locking member extends through the transverse portion in the initial position and extends through the shaft groove longitudinal portion in the final position.

13. The injection system of claim 10, wherein the sheath groove comprises a sheath groove longitudinal portion and an oblique portion relative to the longitudinal direction, and wherein the locking member extends through the sheath groove longitudinal portion in the initial position and extends through the oblique portion in the final position.

14. An injection system for injecting a substance into a plurality of eggs, the system comprising:
a main support;
a main actuator configured to move the main support;
a plurality of injectors mounted on the main support and movable together along a longitudinal direction as the main actuator moves the main support; and
a plurality of individual actuators, each individual actuator being coupled to a single corresponding injector of said plurality of injectors, each individual actuator being configured to move the corresponding injector in the longitudinal direction independent of other actuators,
wherein each injector comprises:
a shaft,
a sheath mechanically coupled to the shaft,
a trocar positioned at least partly inside the sheath, and
a needle at least partly inside the trocar;
wherein the main actuator and the injectors are configured to move the trocar outside the sheath in a first longitudinal movement, and
wherein each individual actuator and each corresponding individual actuator are configured to move the needle outside the trocar in a second longitudinal movement following the first longitudinal movement.

15. The injection system of claim 14, wherein each corresponding injector is configured to couple the trocar and the shaft to move together during the first longitudinal movement, and wherein each corresponding injector is further configured to decouple the trocar from the shaft during the second longitudinal movement.

16. The injection system of claim 14, wherein the main actuator is configured to apply a first force during the first longitudinal movement, wherein each actuator is further configured to apply a second force during the second longitudinal movement, and wherein the first force is greater than the second force.

17. An method for injecting a substance into a plurality of eggs, the method comprising:
positioning a tray of eggs near a plurality of injectors, said tray having a plurality of alveoli, a sub-set of alveoli each containing an egg and another sub-set of alveoli being empty;
moving all injectors over an initial distance with a main actuator such that each egg on the tray is in contact with one injector;
extending trocars out of the injectors in contact with the eggs to pierce a shell of each egg with a trocar while not extending trocars out of injectors above empty alveoli, wherein for each injector said extending of the trocar is performed with the main actuator; and
extending needles out of the trocars for each injector in contact with an egg to inject the eggs with the substance, while not extending needles out of the trocars for injectors above empty alveoli, wherein for each injector the extending of the needle is performed with individual actuators, each individual actuator being configured to move a single injector independently of other individual actuators.

18. The method of claim 17, wherein the extending of the trocar is performed by the main actuator with a first force and the extending of the needles with the individual actuators is performed with a second force, the first force being greater than the second force.

19. The method of claim 17, wherein the extending of the needles is performed by mechanically decoupling the trocars from the needles in the longitudinal direction.

20. The method of claim 17, further comprising cleaning the trocars and the needles by injecting a cleaning fluid inside the trocars.

* * * * *